A. N. BARRON & W. G. WAITT.
DRY CELL.
APPLICATION FILED MAR. 26, 1910.
969,512.
Patented Sept. 6, 1910.
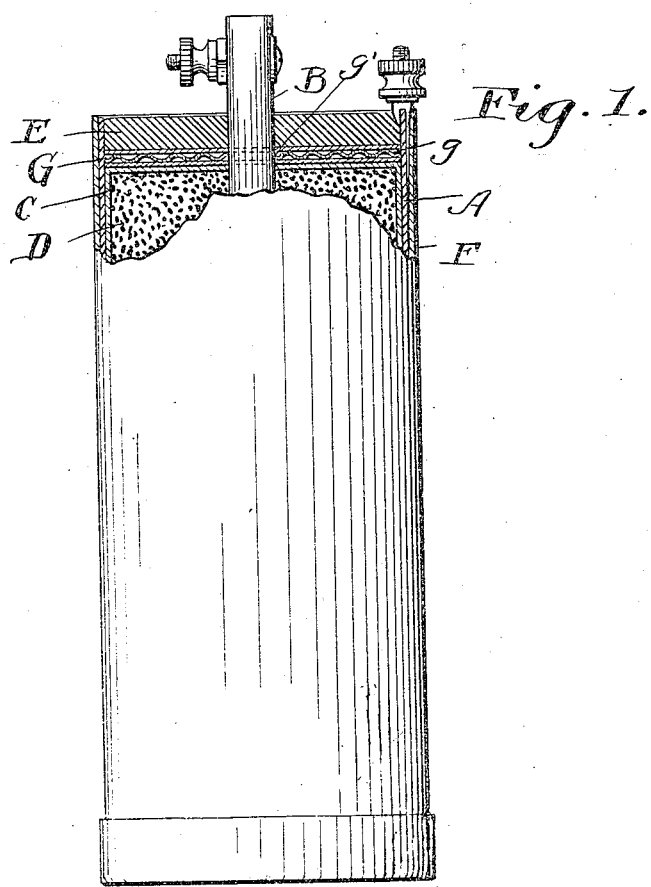
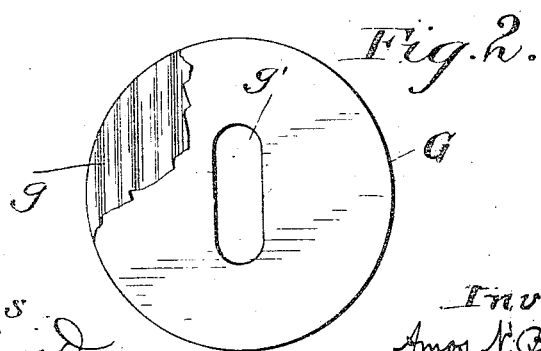
Witnesses
E. B. Gilchrist
H. P. Sullivan
Inventors
Amos N. Barron
Walter G. Waitt
by Thurston & Kwis
Attorneys

UNITED STATES PATENT OFFICE.

AMOS N. BARRON, OF CLEVELAND, AND WALTER G. WAITT, OF FREMONT, OHIO, ASSIGNORS TO NATIONAL CARBON COMPANY, OF CLEVELAND, OHIO, A CORPORATION OF NEW JERSEY.

DRY CELL.

969,512.

Specification of Letters Patent. Patented Sept. 6, 1910.

Application filed March 26, 1910. Serial No. 551,668.

*To all whom it may concern:*

Be it known that we, AMOS N. BARRON and WALTER G. WAITT, citizens of the United States, and residents, respectively, of Cleveland, in the county of Cuyahoga and State of Ohio, and Fremont, in the county of Sandusky and State of Ohio, have invented a certain new and useful Improvement in Dry Cells, of which the following is a full, clear, and exact description.

When dry cells of ordinary construction are subjected to severe strains or short circuits, the battery solution is frequently forced up between the metal cup and the sealing material, overflowing the cup and wetting the insulating jackets around the same, and also wetting the jackets of adjacent cells. As the battery solution is a good conductor of electricity, the insulating jackets, after becoming wet, are no longer insulators. The adjacent cells are therefore electrically connected by the wet jackets, and are externally short circuited and quickly ruined.

The object of the present invention is to prevent the escape of the solution between the cell and the metal cup, and to thereby prevent the ruinous consequences of such escape.

The invention consists broadly in putting into the cell between the seal and the battery mix a layer of material containing cells, into which the solution forced upward from the mix may flow and remain, instead of passing between the seal and the metal cup.

The invention also consists in more specifically defined characteristics of construction as set forth in the appended claims.

In the drawing, Figure 1 is an elevation in central section at its upper end of a cell embodying the invention; and Fig. 2 is a plan view partly broken away of the disk of cellular material in the form most satisfactory for the intended use.

The cell, as shown, comprises a zinc cup A, a carbon electrode B, a bibulous lining C, the tightly packed battery mix D, the seal E, and the insulating outer jacket F, and in these respects it is like the cells in common use. But between the tightly packed battery mix and the seal, the cell contains a disk G of cellular material—that is to say, material having cells $g$ in which the solution forced up from the mix may be received. This disk, as shown, is made of what is known as double faced corrugated straw-board, and consists of a top and bottom layer and an intermediate corrugated layer of straw-board, all glued together. This disk is of such size as to fit tightly within the cup; and it has a hole $g'$ through it for the passage of the carbon electrode. This material is not only cellular, but it is also absorbent, and this makes it of additional value when used in the manner stated.

In constructing the cell, the battery mix is packed in the lined cup, and the bibulous lining turned over on top of the mix, and then this disk is put in the position shown. The sealing material is then run into the cell, while in a semi-fluid condition. It will attach itself to the top layer of straw-[board] and thereby this disk G serves also as a binder for the sealing material, which greatly diminishes its liability to crack after it has hardened.

Having described our invention, we claim:

1. A dry cell comprising a zinc cup having a bibulous lining, a carbon electrode and battery mix tightly packed in the lined cell around the electrode, the said bibulous lining extending across the top of the mix, a disk of material resting upon the said bibulous lining upon the top of the mix and surrounding the electrode, said disk comprising a top and bottom member of absorbent material, a corrugated member of absorbent material spacing them apart, and a seal in the cup on top of said disk.

2. A dry cell comprising a zinc cup having a bibulous lining, a carbon electrode, and battery mix tightly packed in the lined cell around said electrode, a disk which embraces the electrode and fits within the cup, said disk being made of double faced corrugated straw-board, and a seal in the cup on top of this disk.

3. A dry cell comprising a zinc cup having a bibulous lining, a carbon electrode and battery mix tightly placed in the cell around the electrode, a disk resting upon said mix and surrounding the electrode, said disk comprising a top and bottom member of bibulous material, and means for spacing the said members apart whereby a number of chambers are formed in the space between the said top and bottom members.

In testimony whereof, we hereunto affix our signatures in the presence of two witnesses.

AMOS N. BARRON.
WALTER G. WAITT.

Witnesses:
 GEO. W. HAYNES,
 W. P. HAYNES.